April 22, 1969   R. A. COOK   3,439,789
CLUTCH WITH RELEASE LEVERS
Filed Nov. 14, 1966   Sheet 1 of 2

Inventor
RONALD ALAN COOK
By John R. Faulkner
Clifford L. Sadler
Attorney

April 22, 1969  R. A. COOK  3,439,789
CLUTCH WITH RELEASE LEVERS
Filed Nov. 14, 1966
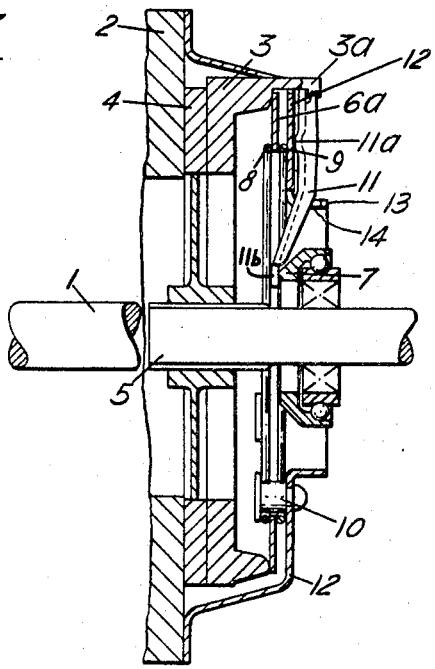
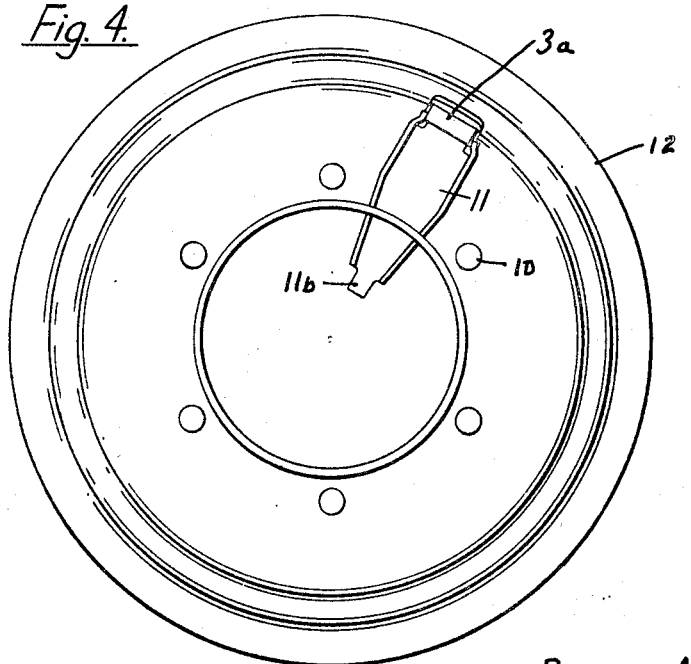
Inventor
RONALD ALAN COOK

United States Patent Office 3,439,789
Patented Apr. 22, 1969

3,439,789
CLUTCH WITH RELEASE LEVERS
Ronald Alan Cook, Hockley, England, assignor to Ford Motor Company, Dearborn, Mich., a corporation of Delaware
Filed Nov. 14, 1966, Ser. No. 593,900
Int. Cl. F16d *13/40, 11/06*
U.S. Cl. 192—70.3        1 Claim

ABSTRACT OF THE DISCLOSURE

A clutch mechanism of the type used in an automobile having a flat annular spring interposed between the cover and the pressure plate and urging the pressure plate into engagement with the clutch disc. The cover has spaced holes through which pressure plate portions protrude. The cover also has holes through which the clutch release levers extend. The levers engage the protruding portions of the pressure plate at one of their ends and the release bearing at their other ends.

---

The present invention relates to clutch mechanisms for motor vehicles.

In a well-known construction of clutches, a diaphragm spring is employed to urge two clutch input members together to clamp a clutch disc between them in order to transmit torque from an input to an output shaft. The diaphragm spring comprises an outer annular portion, the periphery of which engages one of the input members and a plurality of fingers extend radially inwardly from the annular portion. An annular fulcrum member abuts the spring where the outer end of the fingers join the annular portion of the spring. The radially inner ends of the fingers are movable axially to cause the spring to flex about the annular fulcrum member to withdraw the outer periphery of the outer portion from the input member and thus release the pressure on the clutch disc.

In this known construction, the periphery of the annular portion must move a predetermined axial distance in order to release the clutch. This movement is produced by movement of the inner ends of the fingers a given amount in the opposite axial direction. However, owing to the relative flexibility of the fingers, additional work must be done in flexing the fingers before corresponding movement of the periphery of the annular portion is effected. This extra work is reflected in the relatively high pedal pressure required to depress the clutch pedal for a given pedal travel and a given mechanical advantage of the linkage between the pedal and the clutch.

The present invention is concerned with reducing the clutch pedal pressure by modifying the known diaphragm spring.

According to one embodiment of the present invention, a clutch mechanism would have the following features:

(a) an input shaft is connected to drive two input members;

(b) the output shaft has an annular clutch disc keyed to it and the periphery of the disc is located between the input members;

(c) an annular spring member is concentric with the output shaft and its outer periphery engages one input member to urge that input member toward the other member to clamp the clutch disc between them and thus enable torque to be transmitted from the input to the output shaft through the clutch disc;

(d) a fulcrum member bears on the inner periphery of the annular spring member; and (e) a rigid lever member is movable to act upon one input member to move it away from the other input member, against the action of the spring member and thus release the clutch.

How the invention may be carried out will now be described with reference to the accompanying drawings in which:

FIGURE 3 is a view similar to FIGURE 1 of a clutch incorporating the present invention; and FIGURE 4 is a view similar to FIGURE 2 of the clutch of FIGURE 3.

Figure 1:
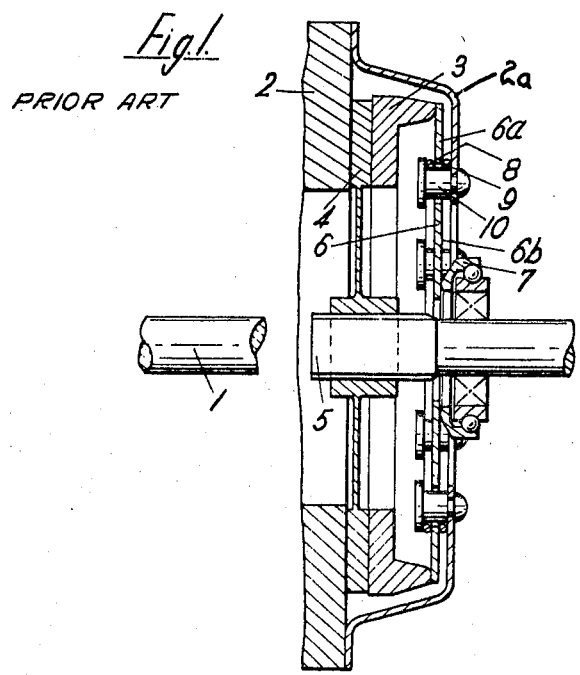
FIGURE 1 is a sectional view of a known construction of clutch mechanism.
Figure 2:
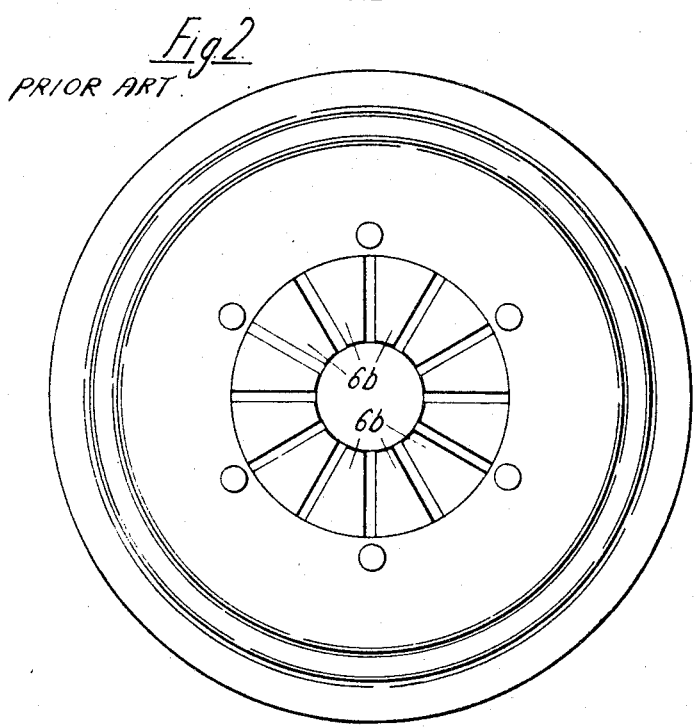
FIGURE 2 is an end view of FIGURE 1.

Referring to FIGURES 1 and 2, the clutch mechanism comprises an input shaft 1 which comprises two input members 2 and 3 that are movable axially with respect to each other. A clutch disc 4 is splined to an output shaft 5 and has its outer periphery located between the input members 2 and 3. A diaphragm spring 6 which is coaxial with the output shaft 5 has its outer periphery abutting against the input member 3 to normally urge the input member 3 toward the input member 2 and thus clamp the clutch disc 4 between them so that torque can be transmitted from the input shaft 1 to the output shaft 5 through the clutch disc 4.

The diaphragm spring 6 comprises an outer annular portion 6a and a plurality of radially inwardly extending fingers 6b. A pair of spaced apart rings 8 and 9 carried by studs 10 mounted on portion 2a of the input member 2, form a fulcrum member for the diaphragm spring 6. The rings 8 and 9 engage the diaphragm spring at the area where the radially outer ends of the fingers 6b join the annular portion 6a of the spring. The radially inner ends of the fingers 6b are movable to the left as seen in FIGURE 1 by a clutch release bearing 7 which is coaxial with the output shaft 5 and movable axially with respect to it. In order to disengage the clutch, the bearing 7 is moved to the left by a suitable actuating mechanism (not shown) to cause the inner ends of the fingers 6b to move in the same direction. This results in the outer periphery of the annular portions 6a moving in the opposite axial direction away from member 3 to thus relieve the pressure on the input member 3.

In this known construction of clutch mechanism, the fingers 6b are relatively flexible so that initial movement of the bearing 7 is taken up in bending the finger 6b and not in moving the outer periphery of the annular portion 6a. This means that in order to produce a given axial movement of the outer periphery of the annular portion 6a, extra work must be done in flexing the fingers 6b.

In the embodiment of the present invention shown in FIGURES 3 and 4, the clutch mechanism is basically the same as that already described with reference to FIGURES 1 and 2 and the same reference numerals have been used to indicate corresponding parts. However, in this embodiment the diaphragm spring only consists of the flat annular portion 6a, and the radial fingers 6b are replaced by separate rigid lever members 11. Each clutch release lever 11 has a radially inner end 11b which is engageable by the bearing 7 in the same manner as the inner end of each finger 6b is engageable by the bearing 7 in the mechanism of FIGURES 1 and 2. The outer end of each lever member 11 engages a projection 3a on the pressure plate or input member 3. An intermediate part 11a of each lever member 11 abuts a clutch cover or casing member 12 which is fixed to the flywheel or input member 2 and is shaped to act as a fulcrum for the lever member 11. The casing member 12 is provided with a flange portion 13 that extends in an axial direction. The flange 13 has circumferentially spaced openings 14 through which the inner ends of the levers 11 pass.

With this arrangement, axial movement of the bearing 7 to the left causes each lever member 11 to pivot about the casing 12 and to pull the member 3 away from the input member 2 against the action of the spring 6a thus releasing the clutch. Since the lever members 11 are rigid compared with the resilient fingers 6b, little extra work has to be done in flexing the lever members 11. In other words, a smaller axial movement of the inner end of each lever 11 is required to disengage the clutch compared with the movement which would be necessary for the inner ends of the fingers 6b in the known clutch mechanism of FIGURES 1 and 2. This means that it is possible to reduce the pedal pressure for a given pedal travel.

The following worked example will illustrate how this is achieved. Consider the clutch of FIGURES 1 and 2. Let the pedal travel be 5 inches, the mechanical advantage of the linkage between the pedal and the bearing be 10:1, the axial force that has to be applied by the bearing 7 in order to disengage the clutch be 200 pounds, and the axial distance the bearing 7 has to move be 0.5 inch. Then the work done by the bearing is equal to 100 inch pounds. Since this must equal the work done on the pedal, the pedal pressure must be 20 pounds.

Consider the clutch of FIGURES 3 and 4. Let the pedal travel again be 5 inches and the bearing force be 200 pounds. However, since the relatively flexible fingers 6b are replayed by rigid members, the bearing travel will be less, say 0.1 inch. Now the work done by the bearing is 20 inch pounds. Since we wish to maintain the pedal travel at 5 inches and the work done on the pedal must equal 20 inch pounds, the new pedal pressure is 4 pounds. Of course, in order to keep the pedal travel the same, the mechanical advantages of the linkage must be altered to 50:1.

The pedal pressure of the known clutch of FIGURES 1 and 2 could of course be reduced by increasing the mechanical advantage of the linkage, but this by itself would result in the pedal travel being increased, in the example above to 25 inches. Therefore, the present invention enables the pedal pressure to be easily reduced while still maintaining the pedal travel within practical limits.

The foregoing description presents the presently preferred embodiment of this invention. Modifications and alterations may occur to those skilled in the art that will come within the scope and spirit of the following claim.

I claim:
1. A clutch mechanism comprising a flywheel, a clutch cover connected to said flywheel, a pressure plate positioned between said cover and said flywheel, a clutch disc positioned between said pressure plate and said flywheel, a flat annular spring having substantially circular inner and outer peripheries, said spring being positioned between said cover and said pressure plate and constructed to urge said pressure plate against said disc, said spring having an outer periphery engaging said pressure plate, fulcrum means securing the inner periphery of said spring to said cover, said spring exerting a force tending to move said pressure plate away from said cover into engagement with said disc, said cover having circumferentially spaced first openings, said pressure plate having extending portions protruding through said first openings of said cover, a plurality of circumferentially spaced apart release levers having their outer ends in hooked engagement with said extending portions and extending radially therefrom, said levers each having an intermediate fulcrum portion supported on said cover, said cover having a flange portion at its inner edge extending axially away from said clutch disc, said flange portion having circumferentially spaced second openings, said release levers having their inner ends protruding through said second openings, said fulcrum means securing said spring to said cover at a location intermediate said first openings and said second openings, an axially movable clutch release bearing constructed to engage the inner ends of said release levers to pivot each of said levers about its fulcrum and thereby move said pressure plate away from said disc against the force of said spring.

References Cited
UNITED STATES PATENTS

| | | | |
|---|---|---|---|
| 2,045,557 | 6/1936 | Almen et al. | 192—89 XR |
| 2,063,203 | 12/1936 | Stanley | 192—68 |
| 2,641,344 | 6/1953 | Banker | 192—68 |
| 3,018,863 | 1/1962 | Elfes | 192—68 XR |
| 3,337,016 | 8/1967 | Maucher. | |
| 3,340,974 | 12/1967 | Maucher. | |

BENJAMIN W. WYCHE III, *Primary Examiner.*

L. J. PAYNE, *Assistant Examiner.*

U.S. Cl. X.R.

192—89